(12) United States Patent
Xia et al.

(10) Patent No.: US 10,832,239 B2
(45) Date of Patent: Nov. 10, 2020

(54) SMART CONTRACT WHITELISTS

(71) Applicant: Alibaba Group Holding Limited, George Town (KY)

(72) Inventors: Ning Xia, Hangzhou (CN); Guilu Xie, Hangzhou (CN); Fuxi Deng, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/422,110

(22) Filed: May 24, 2019

(65) Prior Publication Data

US 2019/0279201 A1 Sep. 12, 2019

Related U.S. Application Data

(63) Continuation of application No. PCT/CN2018/124852, filed on Dec. 28, 2018.

(51) Int. Cl.
*G06Q 20/38* (2012.01)
*G06F 16/182* (2019.01)
(Continued)

(52) U.S. Cl.
CPC ....... *G06Q 20/382* (2013.01); *G06F 16/1824* (2019.01); *G06F 16/1834* (2019.01);
(Continued)

(58) Field of Classification Search
CPC ............. G06Q 50/184; G06Q 20/4016; G06Q 20/382; G06Q 10/083; G06Q 30/04;
(Continued)

(56) References Cited

U.S. PATENT DOCUMENTS 7,490,237 B1 2/2009 Morais et al.
2006/0242245 A1* 10/2006 Christensen ............ H04L 51/12
709/206
(Continued)

FOREIGN PATENT DOCUMENTS

CN 108696502 10/2018
KR 101878869 8/2018
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Johann Y Choo
(74) *Attorney, Agent, or Firm* — Fish & Richardson P.C.

(57) ABSTRACT

Implementations of this specification include identifying, by a node of the blockchain network, a request to execute a smart contract stored in a blockchain maintained by the blockchain network, the request identifying a requesting account that is requesting to execute the smart contract; retrieving, by the node, a whitelist from the blockchain associated with the smart contract, the whitelist identifying one or more accounts that are authorized to execute the smart contract; determining, by the node, that the requesting account is authorized to execute the smart contract based on the requesting account being included in the whitelist; and in response to determining that the requesting account is authorized to execute the smart contract, executing, by the node, the smart contract.

20 Claims, 6 Drawing Sheets

(51) Int. Cl.
  *H04L 9/06* (2006.01)
  *H04L 29/06* (2006.01)
  *G06F 21/62* (2013.01)
  *H04L 9/32* (2006.01)

(52) U.S. Cl.
  CPC ........ *G06F 21/6209* (2013.01); *H04L 9/0643* (2013.01); *H04L 9/3236* (2013.01); *H04L 63/101* (2013.01); *H04L 2209/38* (2013.01)

(58) Field of Classification Search
  CPC .. G06Q 20/3829; G06Q 30/06; G06Q 20/401; G06Q 20/405
  See application file for complete search history.

(56) References Cited

U.S. PATENT DOCUMENTS

| | | | | |
|---|---|---|---|---|
| 2007/0233615 | A1* | 10/2007 | Tumminaro | G06Q 20/12 705/75 |
| 2012/0191855 | A1* | 7/2012 | Alexander | G06F 16/957 709/225 |
| 2012/0216049 | A1* | 8/2012 | Boivie | G06F 21/57 713/189 |
| 2015/0012434 | A1* | 1/2015 | Aabye | G06Q 20/027 705/44 |
| 2015/0332223 | A1* | 11/2015 | Aaron | G06Q 20/42 705/39 |
| 2017/0155515 | A1* | 6/2017 | Androulaki | G06F 21/64 |
| 2017/0344988 | A1* | 11/2017 | Cusden | H04L 9/3247 |
| 2018/0019879 | A1 | 1/2018 | Kravitz et al. | |
| 2018/0019993 | A1 | 1/2018 | Kravitz et al. | |
| 2018/0075028 | A1* | 3/2018 | Ruschin | G06F 21/6218 |
| 2018/0191714 | A1 | 7/2018 | Jentzsch et al. | |
| 2019/0087446 | A1* | 3/2019 | Sharma | G06Q 20/382 |
| 2019/0114706 | A1* | 4/2019 | Bell | G06Q 40/025 |

FOREIGN PATENT DOCUMENTS

| | | |
|---|---|---|
| KR | 20190041784 | 4/2019 |
| RU | 2579979 | 4/2016 |
| RU | 2667801 | 9/2018 |
| WO | WO 2018006056 | 1/2018 |
| WO | WO 2018237264 | 12/2018 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2018/124852, dated Sep. 30, 2019, 7 pages.

Kirkman et al, "A Data Movement Policy Framework for Improving Trust in the Cloud Using Smart Contracts and Blockchains", IEEE International Conference on Cloud Engineering (IC2E), Apr. 17, 2018, 4 pages.

Extended European Search Report in European Application No. 18866466.8, dated Mar. 5, 2020, 9 pages.

Kirkman et al., "InterCloud: A Data Movement Policy Dapp for Managing Trust in the Cloud," IEEE International Conference on Computational Science and Computational Intelligence (CSCI), Dec. 2018, pp. 1303-1308.

\* cited by examiner

SMART CONTRACT WHITELISTS

CROSS-REFERENCE TO RELATED APPLICATIONS

This application is a continuation of PCT Application No. PCT/CN2018/124852, filed on Dec. 28, 2018, which is hereby incorporated by reference in its entirety.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular user case. Examples of types of blockchain networks can include public blockchain networks, private blockchain networks, and consortium blockchain networks. A consortium blockchain network is provided for a select group of entities, which control the consensus process, and includes an access control layer.

A smart contract is a set of executable software instructions stored and executed by a blockchain network. Smart contracts are generally stored unencrypted and therefore are visible to all participants in the blockchain network. Participants in the blockchain network can write and publish their own smart contracts, and generally can also call smart contracts that have already been deployed in the blockchain network. Because the set of instructions that can be used in smart contracts are generally Turing complete, smart contracts can support complex logic to support different business scenarios.

The complexity of smart contracts may give rise to security risks. The security risks of smart contracts often come from a collection of accounts that they may affect. Attackers can exploit vulnerabilities in deployed smart contracts to construct a transaction to redirect funds controlled by the smart contract to the attacker's account. A solution to address these security risks associated with smart contracts would be advantageous.

SUMMARY

Implementations of this specification include computer-implemented methods for enforcing account whitelists for smart contracts. More particularly, implementations of this specification are directed to techniques for allowing the creator of a smart contract to define a whitelist specifying which accounts can call the smart contract.

In some implementations, actions include identifying, by a node of the blockchain network, a request to execute a smart contract stored in a blockchain maintained by the blockchain network, the request identifying a requesting account that is requesting to execute the smart contract; retrieving, by the node, a whitelist from the blockchain associated with the smart contract, the whitelist identifying one or more accounts that are authorized to execute the smart contract; determining, by the node, that the requesting account is authorized to execute the smart contract based on the requesting account being included in the whitelist; and in response to determining that the requesting account is authorized to execute the smart contract, executing, by the node, the smart contract. Other implementations include corresponding systems, apparatus, and computer programs, configured to perform the actions of the methods, encoded on computer storage devices.

These and other implementations may each optionally include one or more of the following features:

In some cases, the request is a first request, and the requesting account is a first account, and the method includes identifying, by the node, a second request to execute the smart contract different than the first request, the second request identifying a second account different than the first account; determining, by the node, that the second account is not authorized to execute the smart contract based on the second account not being included in the whitelist; and in response to determining that the requesting account is not authorized to execute the smart contract, rejecting, by the node, the second request to execute the smart contract.

In some implementations, the whitelist is included within a set of executable instructions associated with the smart contract.

In some cases, the whitelist is separate from a set of executable instructions associated with the smart contract.

In some implementations, the whitelist includes an identification of the one or more accounts that are authorized to access the smart contract.

In some cases, whitelist includes a reference to a location external to the smart contract that stores the one or more that are authorized to access the smart contract.

In some cases, the whitelist identifies an entity associated with one or more accounts, and determining that the requesting account is authorized to execute the smart contract includes determining whether the requesting account is associated with the entity.

This specification also provides one or more non-transitory computer-readable storage media coupled to one or more processors and having instructions stored thereon which, when executed by the one or more processors, cause the one or more processors to perform operations in accordance with implementations of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more implementations of this specification are set forth in the accompanying drawings and the description below. Other features and advantages of this specification will be apparent from the description and drawings, and from the claims.

DETAILED DESCRIPTION

Implementations of this specification include computer-implemented methods for enforcing account whitelists for smart contracts. More particularly, implementations of this specification are directed to techniques for allowing the creator of a smart contract to define a whitelist specifying which accounts can call the smart contract.

To provide further context for implementations of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. The term blockchain is used herein to generally refer to a DLS without reference to any particular use case.

A blockchain is a data structure that stores transactions in a way that the transactions are immutable, and can be subsequently verified. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a data structure for storing transactions, a blockchain network is a network of computing nodes that manage, update, and maintain one or more blockchains. As introduced above, a blockchain network can be provided as a public blockchain network, a private blockchain network, or a consortium blockchain network.

In general, a consortium blockchain network is private among the participating entities. In a consortium blockchain network, the consensus process is controlled by an authorized set of nodes, one or more nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network. Accordingly, the consortium blockchain network can be considered a private network with respect to the participating entities. In some examples, each entity (node) must sign every block in order for the block to be valid, and added to the blockchain. In some examples, at least a sub-set of entities (nodes) (e.g., at least 7 entities) must sign every block in order for the block to be valid, and added to the blockchain.

It is contemplated that implementations of this specification can be realized in any appropriate type of blockchain network.

Implementations of this specification are described in further detail herein in view of the above context. More particularly, and as introduced above, implementations of this specification are directed to techniques for allowing the creator of a smart contract to define a whitelist specifying which accounts can call the smart contract.

Generally, a smart contract is a set of one or more computer instructions that are stored in a blockchain and executed by nodes of a blockchain network. The code for a smart contract is generally transformed into a form that is executable by the nodes of the blockchain network (e.g., bytecode) and either the bytecode itself or bytecode configured to retrieve the smart contract bytecode is stored in the blockchain. Functions defined in the smart contract code can then be called by participants in the blockchain network, causing nodes to execute the instructions in the called function.

This specification describes techniques that allow the creator of a smart contract to specify a list of accounts (a whitelist) in the blockchain network that are permitted to call the smart contract. When a participant in the blockchain network calls a smart contract deployed in the blockchain managed by the blockchain network, the participant provides an account as part of the call. The blockchain network checks the whitelist associated with the smart contract for the participant's account. If the participant's account is in the whitelist, the blockchain network executes the smart contract call. If the participant's account is not in the whitelist, the blockchain network does not execute the smart contract call. The blockchain network may also store a record of the participant's failed attempt to access the smart contract.

Figure 1:
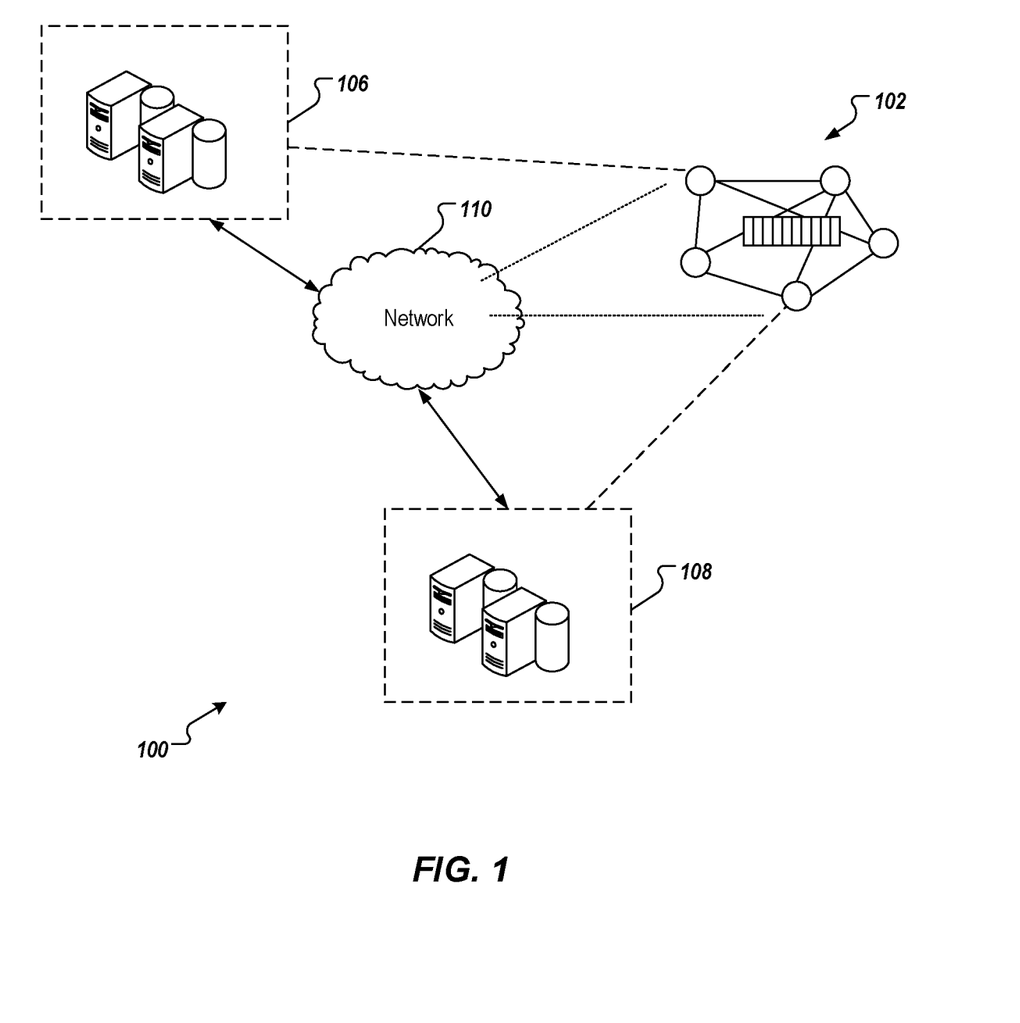
FIG. 1 depicts an example of an environment that can be used to execute implementations of this specification.

FIG. 1 depicts an example of an environment 100 that can be used to execute implementations of this specification. In some examples, the environment 100 enables entities to participate in a blockchain network 102. The environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the blockchain network 102. In general the network 110 represents one or more communication networks. In some cases, the computing devices 106, 108 can be nodes of a cloud computing system (not shown), or can each computing device 106, 108 be a separate cloud computing system including a plurality of computers interconnected by a network and functioning as a distributed processing system.

In the depicted example, the computing systems 106, 108 can each include any appropriate computing system that enables participation as a node in the blockchain network 102. Examples of computing devices include, without limitation, a server, a desktop computer, a laptop computer, a tablet computing device, and a smartphone. In some examples, the computing systems 106, 108 host one or more computer-implemented services for interacting with the blockchain network 102. For example, the computing system 106 can host computer-implemented services of a first entity (e.g., Participant A), such as transaction management system that the first entity uses to manage its transactions with one or more other entities (e.g., other participants). The computing system 108 can host computer-implemented services of a second entity (e.g., Participant B), such as transaction management system that the second entity uses to manage its transactions with one or more other entities (e.g., other participants). In the example of FIG. 1, the blockchain network 102 is represented as a peer-to-peer network of nodes, and the computing systems 106, 108 provide nodes of the first entity, and second entity respectively, which participate in the blockchain network 102.

Figure 2:
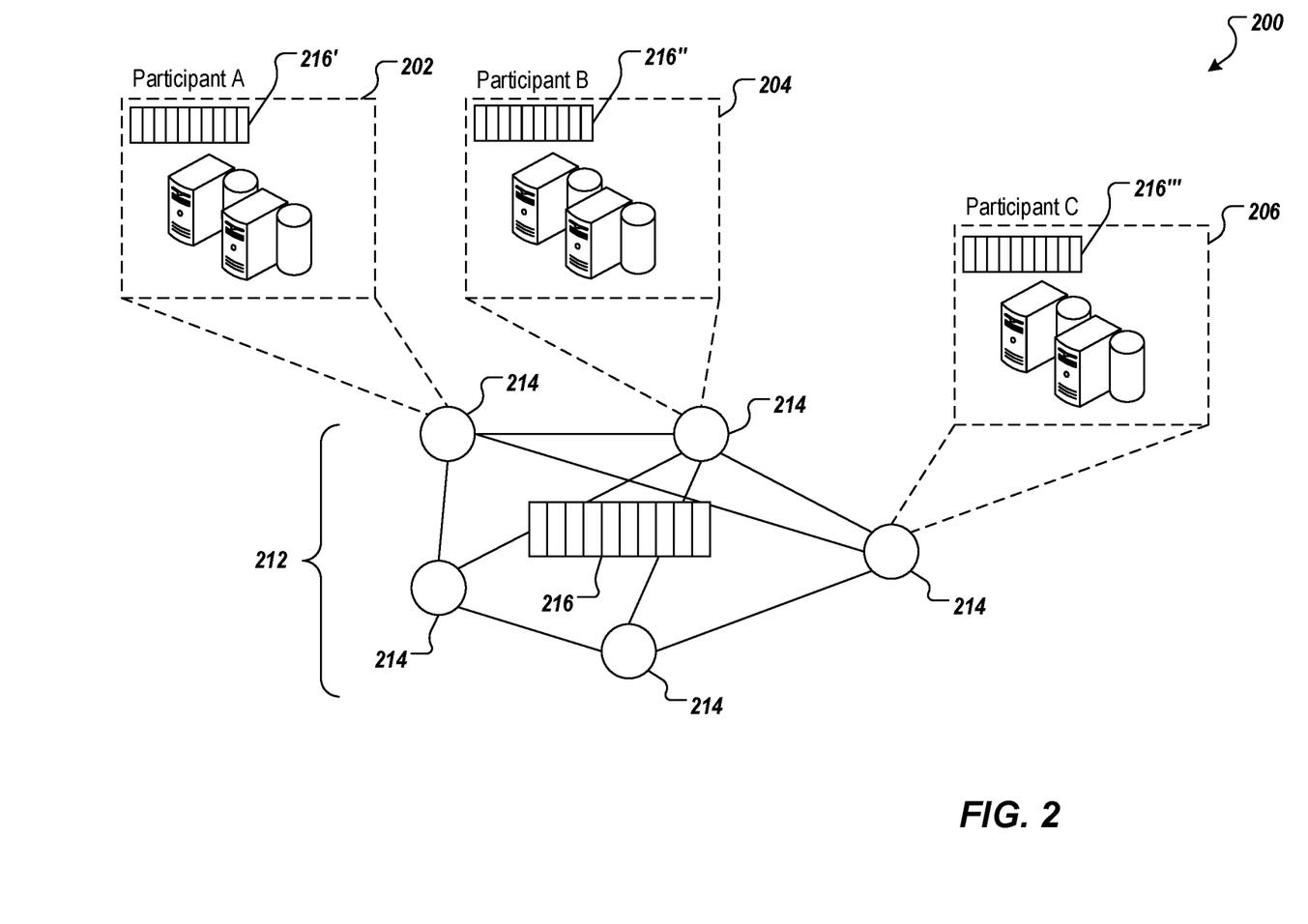
FIG. 2 depicts an example of a conceptual architecture in accordance with implementations of this specification.

FIG. 2 depicts an example of a conceptual architecture 200 in accordance with implementations of this specification. The example of a conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including a plurality of nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as miner nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204, 206 store respective, complete copies 216', 216", 216'" of the blockchain 216.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of transactions can include, without limitation, exchanges of something of value (e.g., assets, products, services). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An examples of hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and compete to have a block added to the blockchain. Such nodes are referred to as miners (or minder nodes). POW, introduced above, is used as a non-limiting example.

The miner nodes execute the consensus process to add transactions to the blockchain. Although multiple miner nodes participate in the consensus process, only one miner node can write the block to the blockchain. That is, the miner nodes compete in the consensus process to have their block added to the blockchain. In further detail, a miner node periodically collects pending transactions from a transaction pool (e.g., up to a predefined limit on the number of transactions that can be included in a block, if any). The transaction pool includes transaction messages from participants in the blockchain network. The miner node constructs a block, and adds the transactions to the block. Before adding the transactions to the block, the miner node checks whether any of the transactions are already included in a block of the blockchain. If a transaction is already included in another block, the transaction is discarded.

The miner node generates a block header, hashes all of the transactions in the block, and combines the hash value in pairs to generate further hash values until a single hash value is provided for all transactions in the block (the Merkle root hash). This hash is added to the block header. The miner also determines the hash value of the most recent block in the blockchain (i.e., the last block added to the blockchain). The miner node also adds a nonce value, and a timestamp to the block header. In a mining process, the miner node attempts to find a hash value that meets required parameters. The miner node keeps changing the nonce value until finding a hash value that meets the required parameters.

Every miner in the blockchain network attempts to find a hash value that meets the required parameters, and, in this way, compete with one another. Eventually, one of the miner nodes finds a hash value that meets the required parameters, and advertises this to all other miner nodes in the blockchain network. The other miner nodes verify the hash value, and if determined to be correct, verifies each transaction in the block, accepts the block, and appends the block to their copy of the blockchain. In this manner, a global state of the blockchain is consistent across all miner nodes within the blockchain network. The above-described process is the POW consensus protocol.

A non-limiting example is provided with reference to FIG. 2. In this example, Participant A wants to send an amount to Participant B. Participant A generates a transaction message (e.g., including From, To, and Value fields), and sends the transaction message to the blockchain network, which adds the transaction message to a transaction pool. Each miner node in the blockchain network creates a block, and takes all transactions from the transaction pool (e.g., up to a predefined limit on the number of transaction that can be added to a block, if any), and adds the transactions to the block. In this manner the transaction published by Participant A is added to the blocks of the miner nodes.

In some blockchain networks, cryptography is implemented to maintain privacy of transactions. For example, if two nodes want to keep a transaction private, such that other nodes in the blockchain network cannot discern details of the transaction, the nodes can encrypt the transaction data. Examples of cryptographic methods include, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

Figure 3:
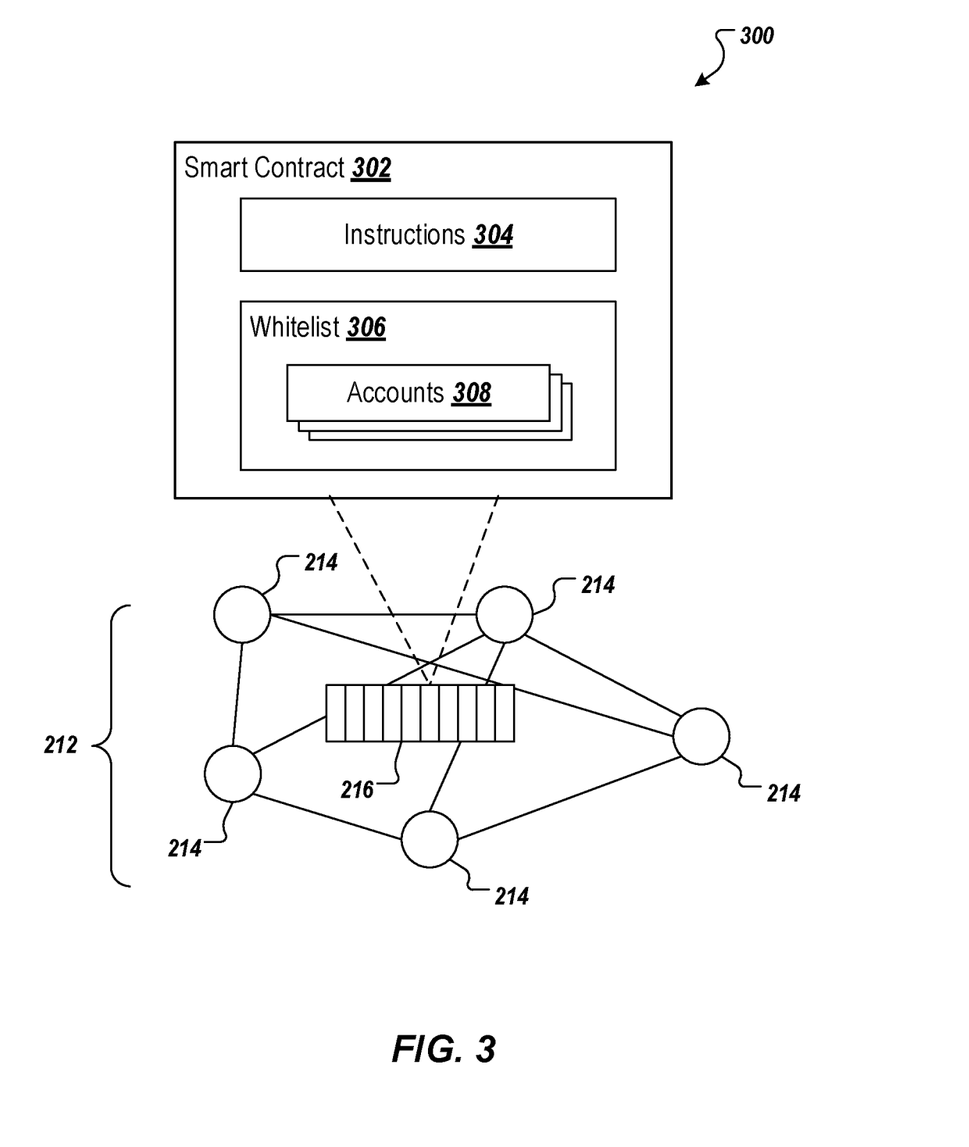
FIG. 3 depicts an example of an environment for enabling smart contract whitelists in accordance with implementations of this specification.

FIG. 3 depicts an example of an environment 300 for enabling smart contract whitelists in accordance with implementations of this specification. As shown, a smart contract 302 is stored in the blockchain 216 of the blockchain network 212 of FIG. 2. The smart contract 302 includes instructions 304 and a whitelist 306. The whitelist 306 includes one or more account 308.

As described above, the smart contract 302 is stored in the blockchain 216. Participants in the blockchain network 212 can call the smart contract 302, which can cause nodes 214 of the blockchain network 212 to execute the instructions 304. In some implementations, the nodes 214 of the blockchain network will check whether an account specified by the caller of the smart contract is included in the one or more accounts 308 specified by the whitelist 306. If the account is in the whitelist 306, the nodes 214 execute the instructions 304. If the account is not in the whitelist 306, the nodes 214 do not execute the instructions 304.

In some implementations, the instructions 304 can be software code written in a high level programming language supported by the nodes 214 of the blockchain network 212, such as, for example, Solidity, Serpent, LLL, Viper, Mutan, C, C++, Python, Java, Javascript, or other programming languages. The instructions 304 may also be compiled bytecode generated from software code associated with the smart contract 302.

In some implementations, the whitelist 306 and the accounts 308 are stored in the blockchain 216 along with the smart contract 302. In some cases, the whitelist 306 and the accounts 308 are included within the instructions 304 of the smart contract 302. For example, the whitelist 306 may be included in a directive in the instructions 304, such as a pre-processor instruction or a specially formatted comment. The whitelist 306 may also be included using a construct specific to the programming language used to author the smart contract, such as a function decorator. The whitelist 306 may also be specified in executable instructions within the instructions 304. In some implementations, the whitelist 306 is examined prior to the nodes 214 executing the instructions 304. In some cases, such as when the whitelist 306 is included in the executable instructions, the nodes 214 may begin execution of the instructions 304 before evaluating the whitelist 306. For example, the smart contract 302 could include a private function defined with the instructions 304 that would take the caller's account as a parameter and verify that the caller is authorized to call the smart contract based on the whitelist 306. Such a function could be called automatically when the smart contract 302 is executed, and the smart contract 302 could simply exit if the account of the caller is not authorized to execute the contract. In some cases, the node 214 that is executing the smart contract 302 could call the private function to check the whitelist 306, and only execute the main function of the smart contract 302 if the call to the private function indicates that the caller's account is authorized to execute the smart contract 302.

Figure 4:
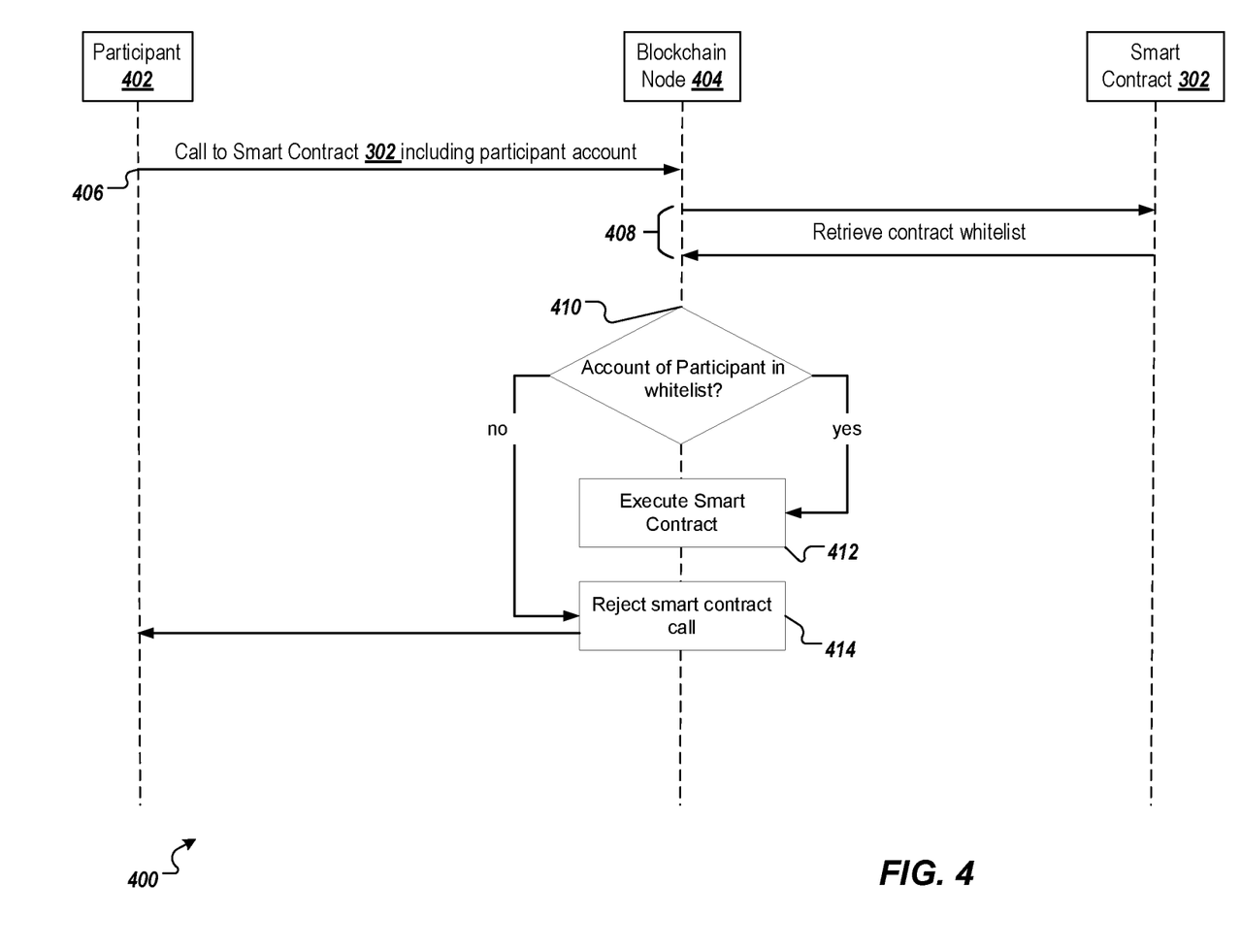
FIG. 4 depicts an example of a signal flow that can be executed in accordance with implementations of this specification.

FIG. 4 depicts an example of a signal flow 400 that can be executed in accordance with implementations of this specification. As shown, a participant 402 in a blockchain network is in communication with a blockchain node 404. The blockchain node 404 reads information from a smart contract 302 that is stored in a blockchain managed by the blockchain network.

At 406, the participant 402 generates a call to the smart contract 302. The call includes an identification of an account associated with the participant 402. In some implementations, the participant 402 calls the smart contract 302 by submitting a transaction to the blockchain network with the smart contract 302 as the destination account. In such a case, the blockchain node 404 will recognize this transaction as a call to the smart contract 302, and will perform the remainder of the signal flow 400.

At 408, the blockchain node 404 retrieves the contract whitelist (e.g., 306) for the smart contract 302. For example, the blockchain node 404 can retrieve the whitelist from the location in the blockchain in which the smart contract 302 is stored.

At 410, the blockchain node 404 determines whether the account provided by the participant 404 is included in the retrieved whitelist for the smart contract 302. This process is described above with respect to FIG. 3. If the blockchain node 404 determines that the account is included in the whitelist, the signal flow 400 continues to 412, and the blockchain node 404 executes the smart contract 302. If the blockchain node 404 determines that the account is not included in the whitelist, the signal flow 400 continues to 414, and the blockchain node 404 does not execute the smart contract 302 and instead rejects the smart contract call. In some cases, the blockchain node 404 will notify the participant that the smart contract call has been rejected. The blockchain node 404 can also record the failed attempt to execute the smart contract 302 in the blockchain or in another storage location.

Figure 5:
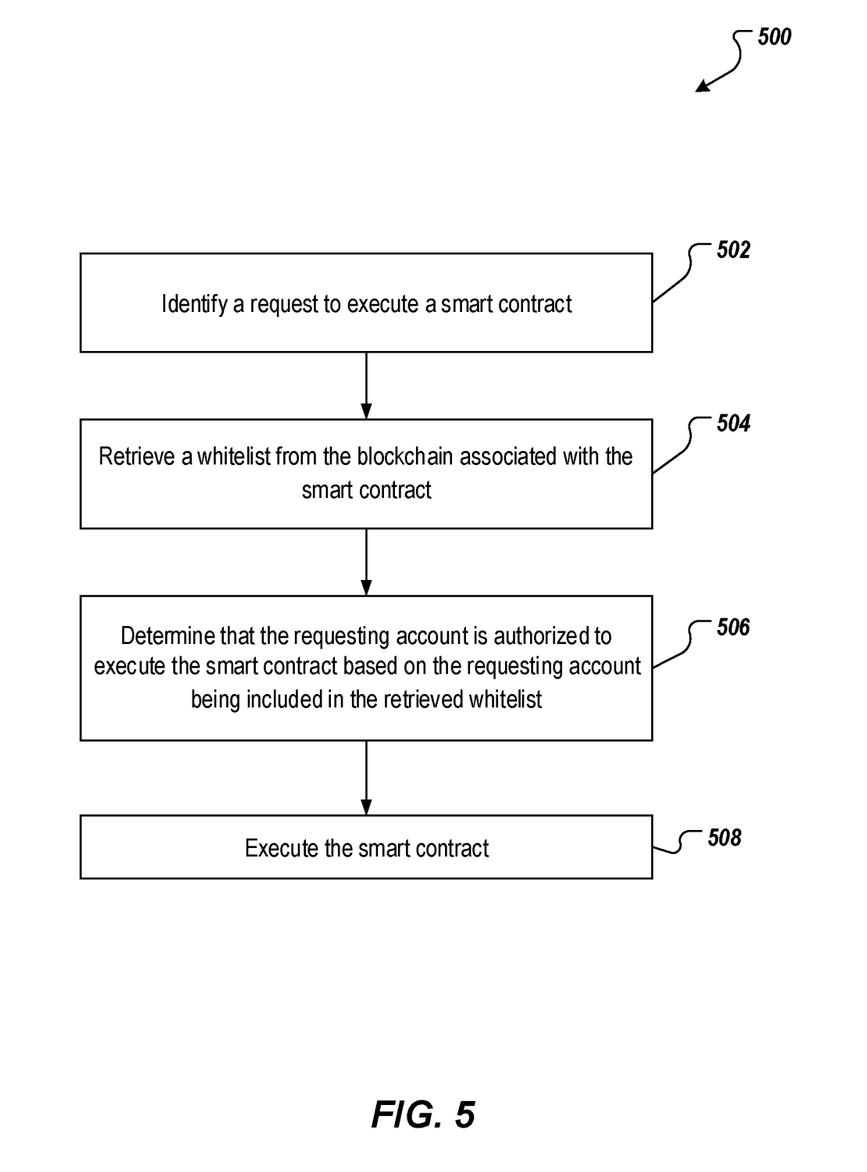
FIG. 5 depicts an example of a process that can be executed in accordance with implementations of this specification.

FIG. 5 depicts an example of a process 500 that can be executed in accordance with implementations of this specification. In some implementations, the process 400 may be performed using one or more computer-executable programs executed using one or more computing devices.

At 502, by a node of the blockchain network identifies a request to execute a smart contract stored in a blockchain maintained by the blockchain network, the request identifying a requesting account that is requesting to execute the smart contract.

At 504, the nodes retrieves a whitelist from the blockchain associated with the smart contract, the whitelist identifying one or more accounts that are authorized to execute the smart contract. In some cases, the whitelist is included within a set of executable instructions associated with the smart contract. In some implementations, the whitelist is separate from a set of executable instructions associated with the smart contract. The whitelist can include an identification of the one or more accounts that are authorized to access the smart contract. In some cases, the whitelist includes a reference to a location external to the smart contract that stores the one or more that are authorized to access the smart contract.

At 506, the node determines that the requesting account is authorized to execute the smart contract based on the requesting account being included in the retrieved whitelist. In some cases, the whitelist identifies an entity associated with one or more accounts, and determining that the requesting account is authorized to execute the smart contract includes determining whether the requesting account is associated with the entity.

At 508, in response to determining that the requesting account is authorized to execute the smart contract, the node executes the smart contract.

In some cases, the request is a first request, the requesting account is a first account, and the process 500 includes identifying a second request to execute the smart contract different than the first request, the second request identifying a second account different than the first account; determining that the second account is not authorized to execute the smart contract based on the second account not being included in the retrieved whitelist; and in response to determining that the requesting account is not authorized to execute the smart contract, rejecting the second request to execute the smart contract.

Figure 6:
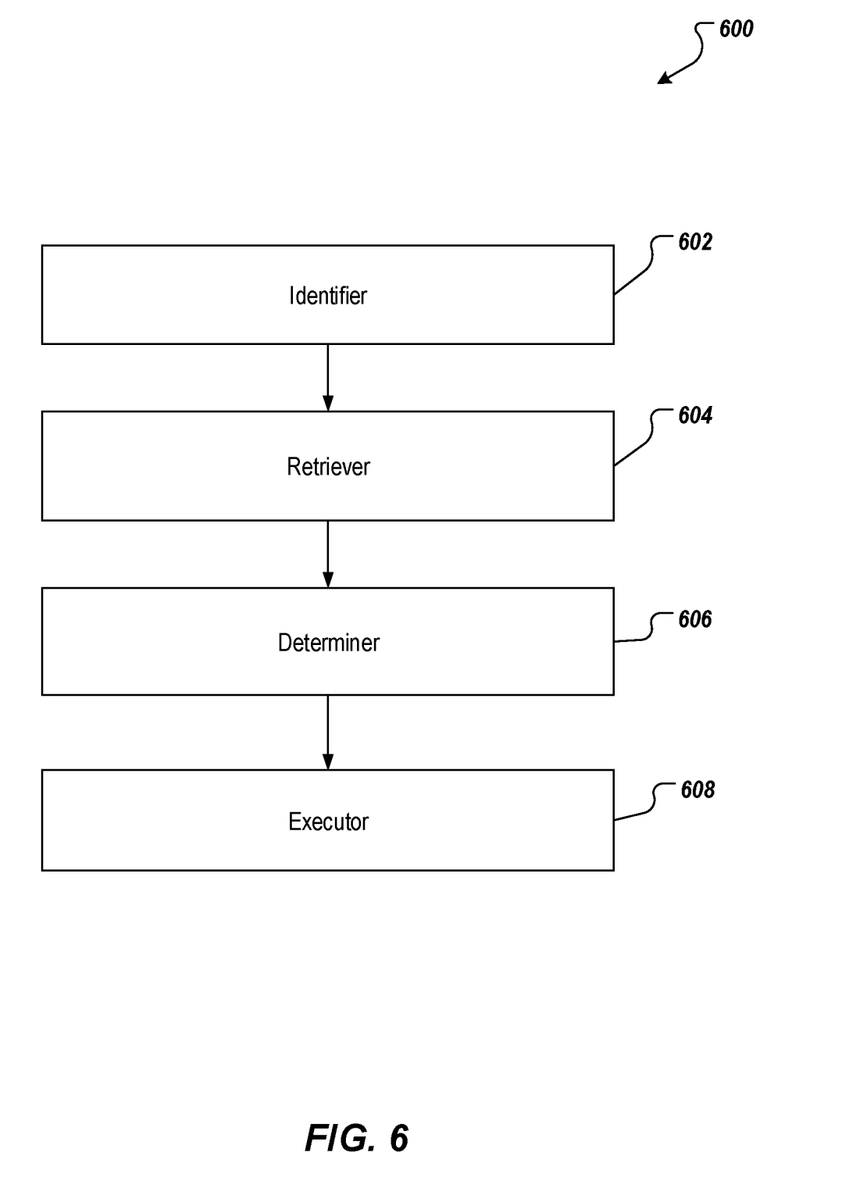
FIG. 6 depicts examples of modules of an apparatus in accordance with implementations of this specification Like reference symbols in the various drawings indicate like elements.

FIG. 6 depicts examples of modules of an apparatus 600 in accordance with implementations of this specification. The apparatus 600 can be a blockchain node configured to control access to smart contracts in a blockchain network, such as a consortium blockchain network. The apparatus 600 can correspond to the implementations described above, and the apparatus 600 includes the following: an identifier or identifying unit 602 for identifying a request to execute a smart contract stored in a blockchain maintained by the blockchain network, the request identifying a requesting account that is requesting to execute the smart contract; a retriever or retrieving unit 604 for retrieving a whitelist from the blockchain associated with the smart contract, the whitelist identifying one or more accounts that are authorized to execute the smart contract; a determiner or determining unit 606 for determining that the requesting account is authorized to execute the smart contract based on the requesting account being included in the whitelist; and an executor or executing unit 608 for executing the smart contract in response to determining that the requesting account is authorized to execute the smart contract.

The system, apparatus, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an implementation process of functions and roles of each unit in the apparatus, references can be made to an implementation process of corresponding steps in the previous method. Details are omitted here for simplicity.

Because an apparatus implementation basically corresponds to a method implementation, for related parts, references can be made to related descriptions in the method implementation. The previously described apparatus implementation is merely an example. The units described as separate parts may or may not be physically separate, and parts displayed as units may or may not be physical units, may be located in one position, or may be distributed on a number of network units. Some or all of the modules can be selected based on actual demands to achieve the objectives of the solutions of the specification. A person of ordinary skill in the art can understand and implement the implementations of the present application without creative efforts.

Referring again to FIG. 6, it can be interpreted as illustrating an internal functional module and a structure of a blockchain node configured to control access to smart contracts in a blockchain network. The blockchain node can be an example of an apparatus configured to control access to smart contracts in a blockchain network.

Implementations of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively, or in addition, the carrier may be an artificially-generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will be coupled to at least one non-transitory computer-readable storage medium (also referred to as a computer-readable memory). The storage medium coupled to the computer can be an internal component of the computer (e.g., an integrated hard drive) or an external component (e.g., universal serial bus (USB) hard drive or a storage system accessed over a network). Examples of storage media can include, for example, magnetic, magneto-optical, or optical disks, solid state drives, network storage resources such as cloud storage systems, or other types of storage media. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, implementations of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific implementation details, these should not be construed as limitations on the scope of what is being claimed, which is defined by the claims themselves, but rather as descriptions of features that may be specific to particular implementations. Certain features that are described in this specification in the context of separate implementations can also be realized in combination in a single implementation. Conversely, various features that are described in the context of a single implementations can also be realized in multiple implementations separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for controlling access to smart contracts in a blockchain network, the method comprising:
   identifying, by a node of the blockchain network, a request to execute a private function of a smart contract stored in a blockchain maintained by the blockchain network, the request comprising a requestor identifier of a requesting account that is requesting to execute the smart contract, wherein the smart contract comprises the private function and a main function;
   executing, by the node, the private function of the smart contract using the requestor identifier to retrieve a whitelist from the blockchain that is associated with the smart contract, wherein the whitelist is predefined before the smart contract is called, the whitelist comprises a function decorator specific to a programming language of the smart contract, the whitelist comprises a reference to a location external to the smart contract that stores identifiers of accounts authorized to execute the smart contract, and the whitelist is configured to be called before an execution of the main function of the smart contract;
   processing, by the node, the whitelist associated with the smart contract to identify, based on the identifiers of the accounts authorized to execute the smart contract, one or more accounts that are authorized to execute the smart contract;
   determining, by the node, that the requesting account is authorized to execute the smart contract based on the requestor identifier of the requesting account being included in the whitelist;
   in response to determining that the requesting account is authorized to execute the smart contract, executing, by the node, the main function of the smart contract, to generate transaction data;
   hashing the transaction data by using a hash function to generate a hash value of the transaction data; and
   encoding the hash value of the transaction data in a tree data structure, wherein a root of the tree data structure comprises a root hash value that is representative of all data in the tree data structure.

2. The method of claim 1, wherein the request is a first request, and the requesting account is a first account, the method comprising:
   identifying, by the node, a second request to execute the smart contract different than the first request, the second request identifying a second account different than the first account;
   determining, by the node, that the second account is not authorized to execute the smart contract based on the second account not being included in the whitelist; and
   in response to determining that the requesting account is not authorized to execute the smart contract, rejecting, by the node, the second request to execute the smart contract.

3. The method of claim 1, wherein the whitelist is included within a set of executable instructions associated with the smart contract.

4. The method of claim 1, wherein the whitelist is separate from a set of executable instructions associated with the smart contract.

5. The method of claim 1, wherein the whitelist includes an identification of the one or more accounts that are authorized to access the smart contract.

6. The method of claim 1, further comprising:
   generating, by the node, a notification based on a result of processing of the whitelist associated with the smart contract.

7. The method of claim 1, wherein the whitelist identifies an entity associated with one or more accounts, and determining that the requesting account is authorized to execute the smart contract includes determining whether the requesting account is associated with the entity.

8. A non-transitory, computer-readable medium storing one or more instructions executable by a computer system to perform operations for controlling access to smart contracts in a blockchain network, the operations comprising:
   identifying, by a node of the blockchain network, a request to execute a private function of a smart contract stored in a blockchain maintained by the blockchain network, the request comprising a requestor identifier of a requesting account that is requesting to execute the smart contract, wherein the smart contract comprises the private function and a main function;
   executing, by the node, the private function of the smart contract using the requestor identifier to retrieve a whitelist from the blockchain that is associated with the smart contract, wherein the whitelist is predefined before the smart contract is called, the whitelist comprises a function decorator specific to a programming language of the smart contract, the whitelist comprises a reference to a location external to the smart contract that stores identifiers of accounts authorized to execute the smart contract, and the whitelist is configured to be called before an execution of the main function of the smart contract;
   processing, by the node, the whitelist associated with the smart contract to identify, based on the identifiers of the accounts authorized to execute the smart contract, one or more accounts that are authorized to execute the smart contract;
   determining, by the node, that the requesting account is authorized to execute the smart contract based on the requestor identifier of the requesting account being included in the whitelist;
   in response to determining that the requesting account is authorized to execute the smart contract, executing, by the node, the main function of the smart contract, to generate transaction data;
   hashing the transaction data by using a hash function to generate a hash value of the transaction data; and encoding the hash value of the transaction data in a tree data structure, wherein a root of the tree data structure comprises a root hash value that is representative of all data in the tree data structure.

9. The non-transitory, computer-readable medium of claim 8, wherein the request is a first request, and the requesting account is a first account, the operations further comprising:
identifying, by the node, a second request to execute the smart contract different than the first request, the second request identifying a second account different than the first account;
determining, by the node, that the second account is not authorized to execute the smart contract based on the second account not being included in the whitelist; and
in response to determining that the requesting account is not authorized to execute the smart contract, rejecting, by the node, the second request to execute the smart contract.

10. The non-transitory, computer-readable medium of claim 8, wherein the whitelist is included within a set of executable instructions associated with the smart contract.

11. The non-transitory, computer-readable medium of claim 8, wherein the whitelist is separate from a set of executable instructions associated with the smart contract.

12. The non-transitory, computer-readable medium of claim 8, wherein the whitelist includes an identification of the one or more accounts that are authorized to access the smart contract.

13. The non-transitory, computer-readable medium of claim 8, wherein the operations further comprise:
generating, by the node, a notification based on a result of processing of the whitelist associated with the smart contract.

14. The non-transitory, computer-readable medium of claim 8, wherein the whitelist identifies an entity associated with one or more accounts, and determining that the requesting account is authorized to execute the smart contract includes determining whether the requesting account is associated with the entity.

15. A system, comprising:
one or more computers; and
one or more computer memory devices interoperably coupled with the one or more computers and having tangible, non-transitory, machine-readable media storing one or more instructions that, when executed by the one or more computers, perform operations for controlling access to smart contracts in a blockchain network, the operations comprising:
identifying, by a node of the blockchain network, a request to execute a private function of a smart contract stored in a blockchain maintained by the blockchain network, the request comprising a requestor identifier of a requesting account that is requesting to execute the smart contract, wherein the smart contract comprises the private function and a main function;
executing, by the node, the private function of the smart contract using the requestor identifier to retrieve a whitelist from the blockchain that is associated with the smart contract, wherein the whitelist is predefined before the smart contract is called, the whitelist comprises a function decorator specific to a programming language of the smart contract, the whitelist comprises a reference to a location external to the smart contract that stores identifiers of accounts authorized to execute the smart contract, and the whitelist is configured to be called before an execution of the main function of the smart contract;
processing, by the node, the whitelist associated with the smart contract to identify, based on the identifiers of the accounts authorized to execute the smart contract, one or more accounts that are authorized to execute the smart contract;
determining, by the node, that the requesting account is authorized to execute the smart contact based on the requestor identifier of the requesting account being included in the whitelist;
in response to determining that the requesting account is authorized to execute the smart contract, executing, by the node, the main function of the smart contract, to generate transaction data,
hashing the transaction data by using a hash function to generate a hash value of the transaction data; and
encoding the hash value of the transaction data in a tree data structure, wherein a root of the tree data structure comprises a root hash value that is representative of all data in the tree data structure.

16. The system of claim 15, wherein the request is a first request, and the requesting account is a first account, the operations further comprising:
identifying, by the node, a second request to execute the smart contract different than the first request, the second request identifying a second account different than the first account;
determining, by the node, that the second account is not authorized to execute the smart contract based on the second account not being included in the whitelist; and
in response to determining that the requesting account is not authorized to execute the smart contract, rejecting, by the node, the second request to execute the smart contract.

17. The system of claim 15, wherein the whitelist is included within a set of executable instructions associated with the smart contract.

18. The system of claim 15, wherein the whitelist is separate from a set of executable instructions associated with the smart contract.

19. The system of claim 15, wherein the whitelist includes an identification of the one or more accounts that are authorized to access the smart contract.

20. The system of claim 15, wherein the operations further comprise:
generating, by the node, a notification based on a result of processing of the whitelist associated with the smart contract.

* * * * *